United States Patent [19]
Fukita et al.

[11] Patent Number: 4,787,720
[45] Date of Patent: Nov. 29, 1988

[54] LENS MOUNTING

[75] Inventors: Susumu Fukita; Yoshitaka Noh, both of Kanagawa, Japan

[73] Assignee: Canon Kabushiki Kaisha, Tokyo, Japan

[21] Appl. No.: 29,894

[22] Filed: Mar. 25, 1987

[30] Foreign Application Priority Data

Apr. 8, 1986 [JP] Japan .......................... 61-052946[U]

[51] Int. Cl.$^4$ ............................................. G02B 7/04
[52] U.S. Cl. .................................... 350/429; 350/255
[58] Field of Search ............. 350/429, 430, 255, 247, 350/252; 354/286

[56] References Cited

U.S. PATENT DOCUMENTS 3,951,522  4/1976  Hashimoto .......................... 350/429
4,636,042  1/1987  Komine et al. ..................... 350/429
4,676,605  6/1987  Toda et al. ........................ 350/429

Primary Examiner—John K. Corbin
Assistant Examiner—Loha Ben
Attorney, Agent, or Firm—Fitzpatrick, Cella, Harper & Scinto

[57] ABSTRACT

A cam sleeve for axially moving a lens as it rotates about an optical axis is provided with a pair of camming grooves that depict the same locus. And, a holding member for the lens to be guided by a guide member is provided with a pair of pins corresponding to the pair of camming grooves. These pins engage in the pair of camming grooves to achieve good stability of movement of the lens when the cam sleeve rotates.

3 Claims, 3 Drawing Sheets

LENS MOUNTING

BACKGROUND OF THE INVENTION

1. Field of the Invention

This invention relates to the structure of a lens mounting of relatively large size capable of attaching to a television camera, single lens reflex camera or video camera, and more particularly to improvements of the cam mechanism for controlling movement of lenses along an optical axis of the photographic optical system.

2. Description of the Related Art

In the zoom lenses of the mechanical compensation type, it has been common in the art that the movement of the movable lens units is controlled by the camming slits of the cam sleeve. In other words, the guide pins planted on the holding rings of the movable lens units engage in the linear camming slits provided in the fixed tube in parallel to the optical axis and the non-linear camming slits of the cam sleeve so that as the cam sleeve rotates about the optical axis, the guide pins move in the camming slits.

Particularly in the lens mounting of relatively small size such as the interchangeable one for 8 mm cine cameras or single lens reflex cameras, the cam sleeve in many cases is provided with a plurality of camming slits.

On the other hand, a sectional view of the conventional lens mounting of relatively large size for television cameras is shown in FIGS. 5 and 6. For note, FIG. 6 is a cross-sectional view taken along line C—C of FIG. 5. 201 is a magnification varying lens system, and 202 is a compensating lens system. 101 is a focusing sleeve; 102 is a fixed barrel; and 103 is a cam sleeve connected with a zoom actuating ring 110 by a connection pin 109 to rotate, and provided with camming grooves, one for each of holding members 105 and 108, to axially move the magnification varying lens system (variator) 201 and the compensating lens system (compensator) 202 through the holding members 105 and 108. Also, in order to guide the axial movement of the holding members 105 and 108 while restraining them from rotation in accompaniment with rotation of the cam sleeve 103, there are provided a round bar 104 and a round bar 106, both of which are fixed to the fixed barrel 102. The round bar 104 and the holding member 105 engage each other along a certain length, l, in the axial direction. Meanwhile, the round bar 106 is positioned in almost 180° spaced relation to the round bar 104. This round bar 106 generally has a function that restrains it from rotation about the optical axis and makes it engage the holding member 105 with a radial looseness to achieve smoothness of movement of the latter.

However, the zoom lens of this type had a drawback that when in use at an inclined angle, or with the front lens unit pointed either upward or downward, an image shift in the longitudinal or lateral direction was caused to occur, because the holding member 105 holding the variator 201 and the holding member 108 holding the compensator 202 were tilted.

The reason why the holding members tilt is that there is need to provide a minute gap ($\Delta x$) between the round bar 104 and a part 105a of the holding member 105 which engage each other, while the lower engagement of the round bar 106 and the holding member 105 is free in the radial directions. Therefore, when the lens is tilted with the front member downward or upward, the variator 201 and compensator 202 incline to an angle $\theta = \tan^{-1}(\Delta x/l)$, because it is fulcrumed mainly about a forked portion 105b or so-called one-sidedly held. In this case, to reduce this angle, there is a method of lessening the gap $\Delta X$ between the round bar 104 and the holding member 105. But, if it is too much done, the required driving power becomes very large. So, the zooming becomes very difficult to perform. Another method is to increase the length, l, of engagement of the round bar 104 and the holding member 105. But, this leads to increase the size of the lens barrel. Also, because there is a limit on the size of the round bar 104 in the longitudinal direction, too much an increase of the length is not desirable.

SUMMARY OF THE INVENTION

A first object of the invention is to achieve a good stability of lens movement.

A second object of the invention is to reduce the variation of the image shift even when the lens is tilted.

To achieve this object, the present invention has a feature that the cam sleeve for axially moving the lens as it rotates is provided with a pair of camming grooves that depict the same locus, and the holding member of the aforesaid lens is provided with a pair of pins corresponding to the aforesaid one pair of camming grooves, the pair of pins being made to insert into the aforesaid one pair of camming grooves.

Further objects of the invention will become apparent from the following drawings and description.

DETAILED DESCRIPTION OF THE PREFERRED EMBODIMENT

The present invention is next described by reference to the drawings.

Figure 1:
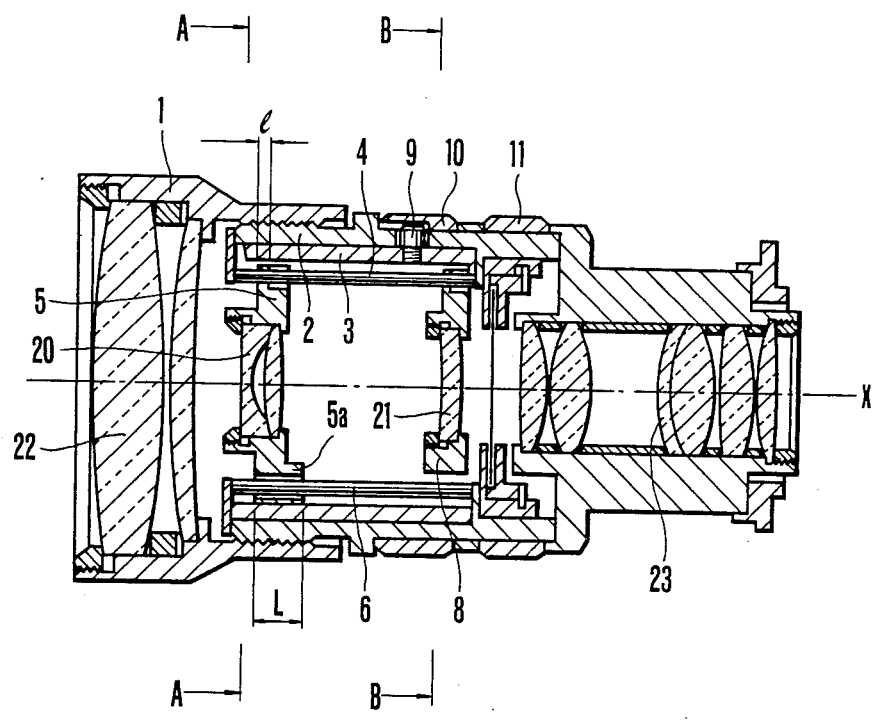
FIG. 1 is a longitudinal section view of a lens mounting of the invention.
Figure 4:
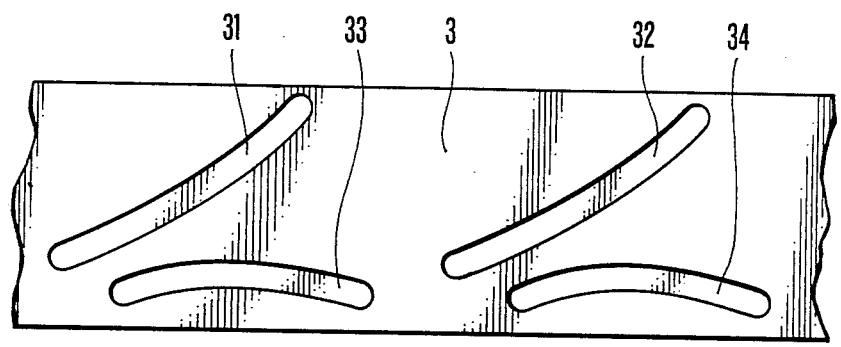
FIG. 4 is an expanded view of the cam sleeve of FIGS. 1 to 3.
Figure 5:
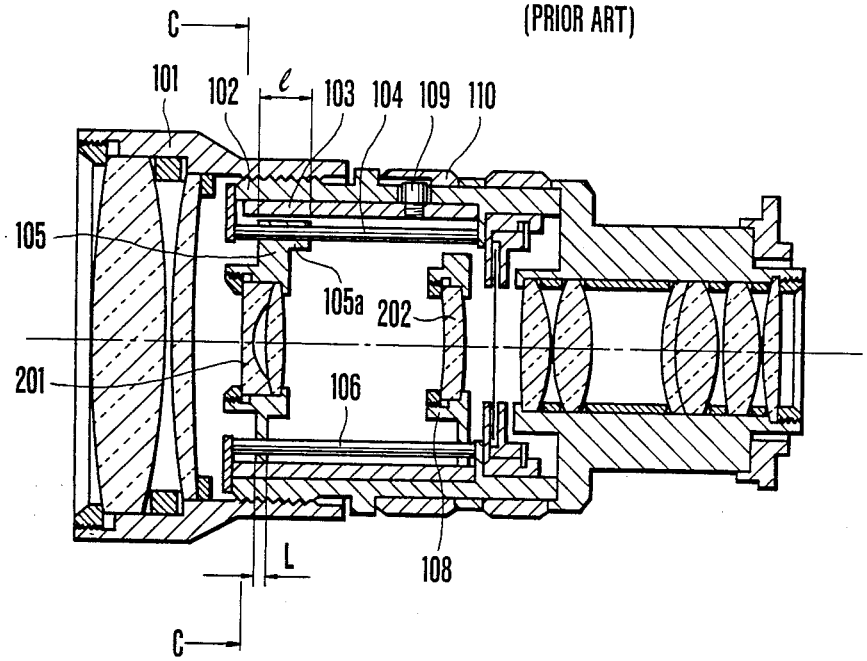
FIG. 5 is a longitudinal view of the conventional lens mounting.
Figure 6:
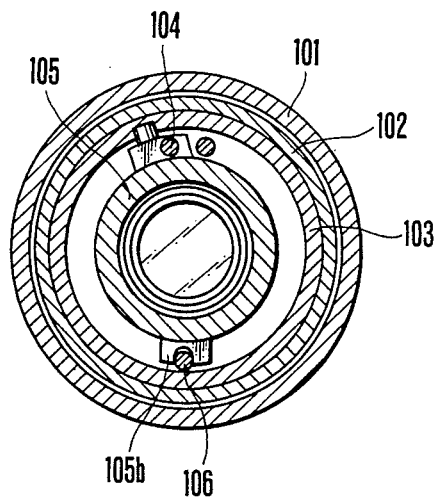
FIG. 6 is a cross-sectional view taken along line C—C of FIG. 5.

FIG. 1 is a sectional view of the lens mounting according to the present invention. 1 is a focusing barrel, and 2 is a fixed barrel. A cam sleeve 3 is rotatably fitted in the inner diameter of the fixed barrel 2, and, as will be described later, provided with two kinds of cam for a magnification varying system 20 and a compensating system 21, each kind of cam having two grooves. An expanded view of this cam sleeve 3 is shown in FIG. 4.

A zoom ring 10 is rotatably fitted on the outer diameter of the fixed barrel 2, and connected as a unit to the cam sleeve 3 by a connection pin 9. A round guide bar 4 is fixedly mounted to the fixed barrel 2. A holding member 5 contains the magnification varying optical system 20, and another holding member 8 contains the compensating optical system 21. These holding members 5 and 8 are axially movably carried on the round bar 4. A round guide bar 6 is fixedly mounted to the fixed barrel 2 to restrain the first holding member 5 from rotation when its forked portion 5a contacts the bar 6 through a length L, as shown in FIG. 2.

A round guide bar 7 also mounted to the barrel 2 adjacent bar 6 restrains the second holding member 8 from rotation when its forked portion contacts the bar 7 (FIG. 3) through a certain length (not shown).

Figure 2:
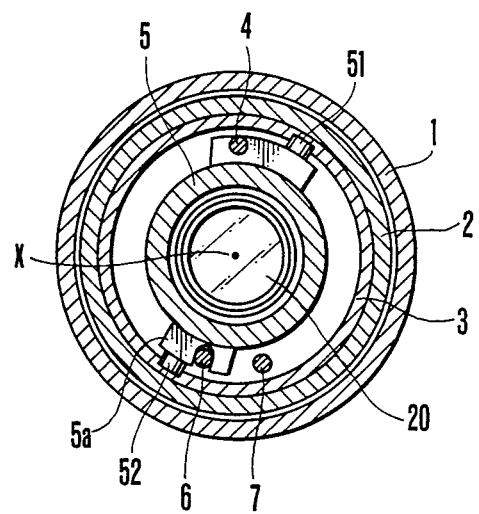
FIG. 2 is a cross-sectional view taken along line A—A of FIG. 1.
Figure 3:
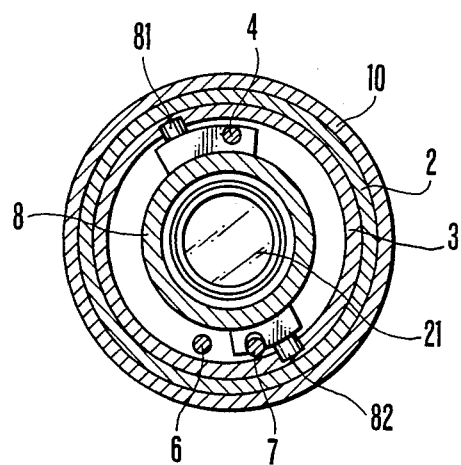
FIG. 3 is a cross-sectional view taken along line B—B of FIG. 1.

FIGS. 2 and 3 are cross-sectional views taken along lines A—A and B—B of FIG. 1 respectively. Two pins 51 and 52 are planted on the holding member 5 in almost 180° spaced relation and are fitted in a pair of camming grooves 31 and 32 respectively machined in the inner surface of the cam sleeve 3. The second holding member 8 also has two pins 81 and 82 positioned in almost 108° spaced relation and slidably fitted in a pair of camming grooves 33 and 34 respectively machined in the inner surface of the cam sleeve 3.

And, as shown in FIG. 4, the first and second pairs of camming grooves 31 and 32, and 33 and 34 are 180° opposed to each other in the cam sleeve 3 and have similar non-linear forms to each other, but the two grooves in each pair are so configured that when the cam sleeve 3 rotates, the magnification varying optical system 20 and the compensating optical system 21 axially move in desired differential relation. For note, the camming grooves 31 to 34 are not penetrated through the entire wall, that is, formed so as to have a bottom.

Now, the axis along which the holding members 5 and 8 move during the rotation of the cam sleeve 3 must be maintained in coincidence with the optical axis. For this purpose, the holding member 5 is made to contact the guide bar 4 and round bar 6, which is disposed almost 180° opposite bar 4, which restrain rotation and permit movement of member parallel to the optical axis through a length, 1. The holding member 5 and the round bar 6 engage each other through a length L, leaving some radial gap therebetween.

For note, 22 is a front lens unit for focusing. and 23 is an image forming lens unit.

The operation of the lens mounting of such construction is described below. Concerning the tilt in the horizontal plane as viewed in FIG. 2, since the contact area of the holding member 5 on the round bar 6 for restraining rotation is the sufficiently long length L, the tilting is limited by this to a negligible amount. As for the tilt in the vertical plane in FIG. 2, since the pins 51 and 52 are spaced 180° from each other and extend in opposite direction to rest on the abutments of the camming grooves 31 and 32 for the magnification varying system machined in the cam sleeve 3, no tilting occurs.

Hence the holding member 5 for the magnification varying system is maintained stable throughout the entire range of axial movement. In this state, when the photographer rotates the zoom ring 10, the cam sleeve 3 is rotated in unison through the connection pin 9. Since the pins 51 and 52 are fitted in the camming grooves 31 and 32 for the magnification varying system, the holding member 5 for the magnification varying system is caused to move axially. Here suppose the lens as a whole is pointed downward (upward likewise), a force is applied on the holding member 5 for the magnification varying system to tilt in the vertical plane in FIG. 2. But, since the pins 51 and 52 which also serve to prevent tilting lie on opposite side of the optical axis (both sided), no tilting will occur.

Exactly the same holds for the second holding member 8 for the compensating system.

As has been described above, the use of the features of the invention produces the following advantages:

(1) It is possible to reduce the deviation of an image plane of sharp focus from the film plane when the entire lens is tilted.

(2) Thanks to the both-sided support of the holding members in the vertical plane, the required driving force of the zoom ring is reduced. Also, even a smoother zooming operation than was heretofore can be carried out.

Though, in the illustrated embodiment, two camming grooves are provided for each movable lens unit, it is needless to say that its number may be increased to 3 or 4.

What is claimed is:

1. A zoom lens comprising:
   an optical system having first and second movable lenses simultaneously moving when zooming and having an optical axis;
   a fixed barrel accommodating said optical system;
   a cam sleeve supported on said fixed barrel rotatably about the optical axis;
   a first pair of camming grooves for controlling the movement of said first movable lens provided in said cam sleeve;
   a second pair of camming grooves for controlling the movement of the second movable lens provided in said cam sleeve;
   a first holding ring holding said first movable lens and having projected portions in engagement with said first pair of camming grooves;
   a second holding ring holding said second movable lens and having projected portions in engagement with said second pair of camming grooves;
   a first guide bar for guiding the axial movements of said first and said second holding rings provided on said fixed barrel so as to lie above said optical axis;
   a second guide bar for guiding the axial movement of said first holding ring fixed to said fixed barrel; and
   a third guide bar for guiding the axial movement of said second holding ring provided on said fixed barrel.

2. A zoom lens according to claim 1, wherein the projected portions of each of said first and said second holding rings are provided almost symmetrical with respect to said optical axis.

3. A lens mounting according to claim 1, wherein the length in the direction of the optical axis of engaging portion of said first holding ring and said first guide bar is longer than the length in the direction of the optical axis of engaging portion between said first holding ring and said second guide bar.

* * * * *

UNITED STATES PATENT AND TRADEMARK OFFICE
CERTIFICATE OF CORRECTION

PATENT NO. : 4,787,720

DATED : November 29, 1988

INVENTOR(S) : SUSUMU FUKITA, ET AL.

It is certified that error appears in the above-identified patent and that said Letters Patent is hereby corrected as shown below:

Column 3, line 33, "member" should read --member 5--;

line 37, "focusing." should read --focusing,--.

Column 4, line 3, "side" should read --sides--;

line 15, "can" should read --available can--.

Signed and Sealed this

Eleventh Day of April, 1989

Attest:

DONALD J. QUIGG

Attesting Officer

Commissioner of Patents and Trademarks